UNITED STATES PATENT OFFICE.

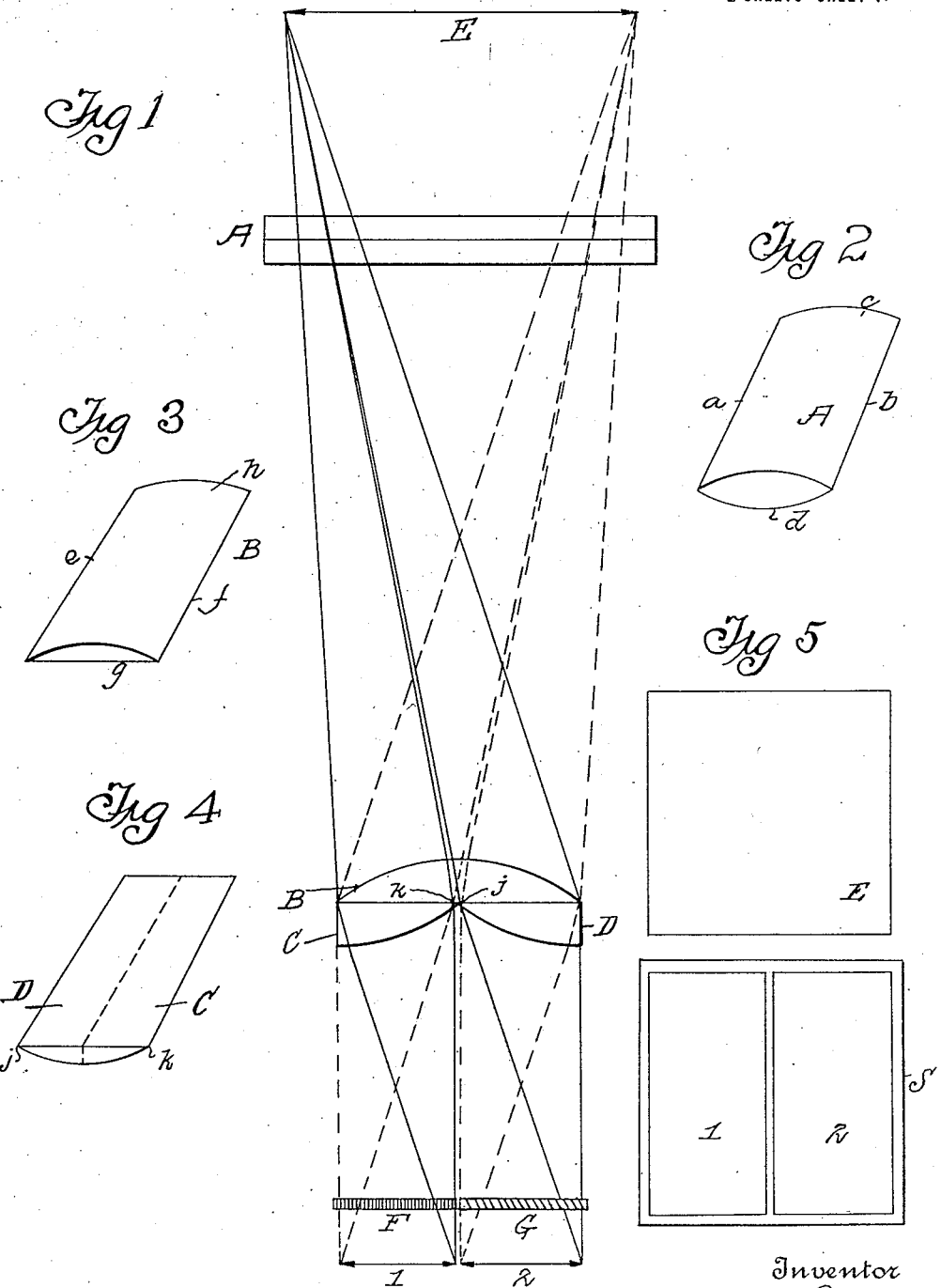

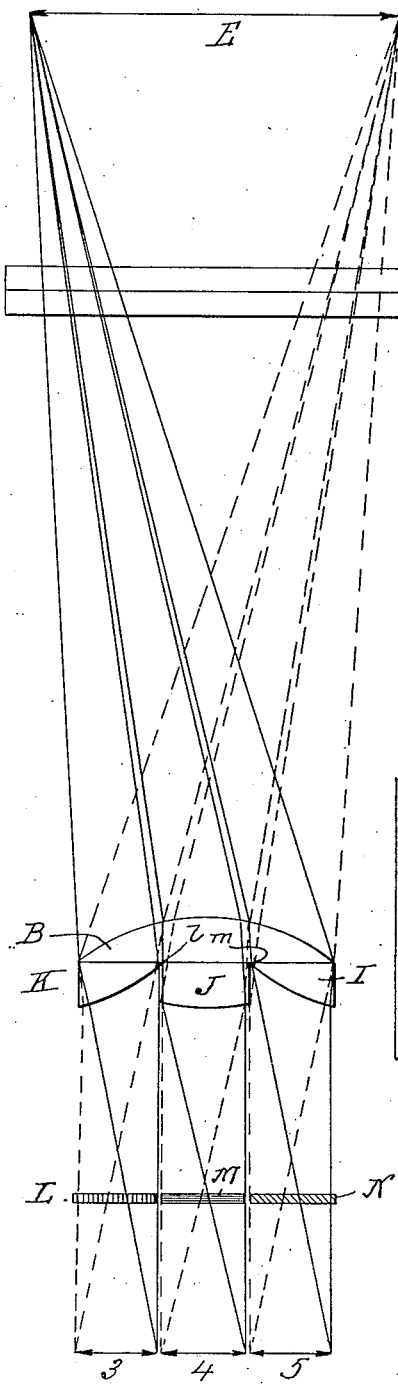

EDWARD C. S. PARKER, OF THE UNITED STATES NAVY.

PHOTOGRAPHIC APPARATUS.

1,328,293.    Specification of Letters Patent.    Patented Jan. 20, 1920.

Application filed May 9, 1919. Serial No. 296,010.

*To all whom it may concern:*

Be it known that I, EDWARD C. S. PARKER, of the United States Navy, a citizen of the United States, have invented a certain new and useful Improvement in Photographic Apparatus, of which the following is a specification.

The invention is an apparatus for making photographs in monochrome from a colored object and projecting an image of said object in corresponding or substantially natural colors upon a suitable screen. That is to say, the apparatus used as a camera produces images of the colored object in monochrome upon a sensitized transparent plate, film, or in general terms "slide," either stationary or moving, the light then proceeding from the object to the slide. When the light is caused to proceed in the reverse direction—that is, through the image on the slide and so through the apparatus to the screen—then an image of the object is projected in substantially natural colors upon said screen and either as a stationary or moving picture. The invention consists more particularly in the construction and arrangement of the lenses and means for dividing the pencil traversing the same into a plurality of separated pencils.

In the accompanying drawings—

Figure 1 is an optical diagram, showing the arrangement of the lenses for producing two images of the object upon a sensitized slide and for projecting said images as a single image in colors upon a screen. Fig. 2 is a perspective view, showing the shape of lens A. Fig. 3 is a similar view, showing the shape of lens B. Fig. 4 is a similar view, showing the shape of lens C or D, indicating by a dotted line how said lenses may be made by longitudinally dividing into two sections a lens similar to lens B. Fig. 5 illustrates an object and the two narrowed images produced by the apparatus of Fig. 1 on a sensitized slide. Fig. 6 is an optical diagram, showing the arrangement of the lenses for producing three images of the object and for projecting said images as a single image in colors upon a screen. Fig. 7 is a perspective view of the shape of lenses I, J, K, indicating by dotted lines how said lenses may be made by longitudinally dividing into three sections a lens similar to lens B. Fig. 8 illustrates an object and the three narrowed images produced by the apparatus of Fig. 6.

Similar letters and numbers of reference indicate like parts.

Referring first to Figs. 1 to 5, inclusive, A is a double convex cylindrical lens; two edges $a$, $b$ of which are straight and formed by the junction of oppositely arc-shaped surfaces $c$, $d$. B is a plano-convex cylindrical lens; two edges $e$, $f$ of said lens are straight and are formed by the junction of the plane surface $g$ and the arc-shaped surface $h$. The lens B is placed with the axis of its curved surfaces relatively perpendicular to the axis of the curved surfaces of lens A, so that the middle point of lens B will be in line with the middle point of lens A. Should a pencil of light from a given object traverse either lens A or lens B only, there will be produced upon a slide a more or less confused appearance of intermingled masses of light and shade. When, however, the two lenses A and B are disposed with their axes relatively perpendicular as described, then an image of the object is produced on the slide S, and this image will also be produced if the light pencil from lens A traverse a fraction of the lens B instead of the whole lens.

To the plane side of lens B, I apply—preferably by cementing—two cylindrical lenses C, D, Fig. 4. Said lenses are alike and are of the shape produced by dividing a plano-convex cylindrical lens, as B, into two longitudinal interchangeable half sections on the dotted line Fig. 4. Said lenses C, D are placed with their edges $j$, $k$ formed by the junction of their plane and curved surfaces abutting, as shown in Fig. 1, each lens C, D then covering one half of the plane surface of lens B.

The light pencil coming from an object as E and traversing lenses A and B successively and lenses C and D simultaneously, will then become divided into two pencils, one of which will form the image 1 and the other the image 2, and so produce two pictures side by side upon any suitable sensitized slide S, Fig. 5, which may be either a fixed plate or a moving picture film.

In the path of each of the separated pencils respectively I place light filters F and G. Filter F may be of red glass and will, therefore, cut off the green rays, and filter G may be of green glass and will, therefore, cut off the red rays. The two images 1 and 2 on the sensitized slide will be in monochrome, but the image 1 will be made by light free from green rays and the image 2 by light free from red rays. If the object be in the shape of a parallelogram, for example, as shown in Fig. 5 at E, then the two images 1, 2 by reason of the shapes of the lenses will be narrowed in width; or in other words, the ratio of the dimensions of each image 1, 2 will be different from the ratio of the dimensions of the object E.

The images 1, 2 being produced and fixed upon a transparent sensitized slide S, if the source of light now be placed in rear of the slide so that the rays therefrom will pass through the apparatus in the reverse direction—that is, through the slide, light filters and lenses—an image of the object in colors corresponding to those of the object (so far as is possible by reproduction of red, green and combinations thereof) will be projected upon any suitable screen. As the images on the slide will be negative, they should be changed to positive in the usual way before projection, if it be desired not to disturb the light filters. Otherwise if the negative slide is retained, the two filters must be exchanged, the green taking the place of the red and the red taking the place of the green.

In Figs. 6, 7 and 8, I illustrate the apparatus as arranged for three color work.

Here three cylindrical lenses I, J, K, preferably of equal width and each covering one third of the plane surface of lens B, are used—the shapes of said lenses being such as would be produced if a lens similar to B were longitudinally divided into three sections on the dotted lines Fig. 7. The lenses I and K would then have the shape of the outer sections and the lens J of the middle section. The lens B is disposed between the edges $l$, $m$ of lenses I, K. The pencil from lenses A, B becomes divided into three pencils which after traversing the three light filters L, M, N—which may be respectively red, blue and green—form three separate images 3, 4, 5 of the object, as before, upon the sensitized slide S. And these images may be projected in the manner already described to form a single picture on the screen in red, green and blue and combinations of said colors.

In another application for Letters Patent Serial No. 296,008 filed by me May 9, 1919, I have described and claimed the method of producing moving pictures which comprises forming a plurality of similarly deformed pictures of the object upon the film and then simultaneously projecting said deformed pictures to reconstruct the projection in normal proportions. The subject-matter of said application is, therefore, not herein claimed.

I claim:

1. Means for dividing a pencil of light rays into a plurality of separate pencils and for causing a plurality of separate pencils to coalesce into a single pencil comprising a cylindrical converging lens, and two cylindrical converging lenses each of a width equal to one half of the width of said first-named lens and each overlapping a half section of said first-named lens, the axes of the cylindrical surfaces of all of said lenses being parallel: whereby a pencil of light when traversing said lenses in one direction is divided into a plurality of separate pencils and whereby separate pencils traversing said lenses in the opposite direction are caused to coalesce to form a single pencil.

2. Means as set forth in claim 1, further including an additional cylindrical converging lens interposed in the path of the rays forming said first-named pencil, the axis of the cylindrical surface of said additional lens being disposed perpendicular to the parallel axes of the cylindrical surfaces of the lenses set forth in said claim.

In testimony whereof I have affixed my signature in presence of two witnesses.

EDWARD C. S. PARKER.

Witnesses:
 GERTRUDE T. PORTER,
 MAY T. McGARRY.